United States Patent [19]

Artemenko et al.

[11] 4,408,145

[45] Oct. 4, 1983

[54] LINEAR ELECTRIC MOTOR

[75] Inventors: Vladimir I. Artemenko; Viktor T. Belikov; Anatoly D. Ivlev; Viktor A. Mamzelev, all of Odessa, U.S.S.R.

[73] Assignee: Odessky Politekhnichesky Institut, Odessa, U.S.S.R.

[21] Appl. No.: 385,373

[22] PCT Filed: Sep. 29, 1980

[86] PCT No.: PCT/SU80/00167

§ 371 Date: May 20, 1982

§ 102(e) Date: May 20, 1982

[87] PCT Pub. No.: WO82/01284

PCT Pub. Date: Apr. 15, 1982

[51] Int. Cl.³ .......................................... H02K 41/00
[52] U.S. Cl. ....................................... 318/135; 310/12
[58] Field of Search ................................ 310/12–14; 318/135

[56] References Cited

U.S. PATENT DOCUMENTS 3,456,136  7/1969  Pierro ..................................... 310/12
3,699,365  10/1972 Leitgeb ................................... 310/12
3,706,922  12/1972 Iuagaki ................................. 318/135
3,999,107  12/1976 Reuting ................................ 318/135
4,369,383  1/1983  Langley ................................. 310/12

Primary Examiner—Donovan F. Duggan
Attorney, Agent, or Firm—Myron Greenspan; Burton L. Lilling; Bruce E. Lilling

[57] ABSTRACT

A linear electric motor comprises a stator constructed in the form of two equidistant ferromagnetic strips 1 and 2 provided with alternating projections 3 and recesses 4 having a length equal to the pole pitch $\tau$ of the motor. A movable core 5 is disposed between the poles 1 and 2. The projections of the strip 1 are shifted relative to the projections on the strip 2 by a distance $\tau$. An excitation winding 3 is laid in the middle portion of the core 5, characterized by a low magnetic permeability. An armature winding 9 is laid in the extreme portions of the core 5, having a high magnetic permeability, in symmetrical relationship with respect to a winding 8. Two coil groups of the winding 9 have equal number of sections and are electrically connected in a commutation device 10.

1 Claim, 3 Drawing Figures

LINEAR ELECTRIC MOTOR

TECHNICAL FIELD

The invention relates to electric machines, and particularly concerns a linear electric motor.

BACKGROUND ART

Linear electric motors are well known and used in various branches of industry and in transport. Among the main advantages of such motors, practically complete elimination from the electric driving system of intermediate mechanical, hydraulic and similar devices for transforming rotary motion into translational one is to be noted.

Such an arrangement results in an increase in the drive reliability as a whole and allows the existing possibilities of automatic control circuits to be completely utilized, which possibilities are impossible to be realized at the modern level of production technology of such transforming devices.

However, the experts dealing with the development of linear electric motors and especially those utilizing the principle of combining armature and field windings, are facing the problem of increasing the degree of utilization of their active materials.

Known in the art are linear motors (USSR Author's Certificate No. 192895, Int. Cl. H 02n, published Mar. 2, 1967) whose design allows this problem to be solved to a certain extent. Said motor comprises a stator whose magnetic core is formed by two equidistant strips made of a ferromagnetic material. Each strip is provided with uniformly alternating projections and recesses, disposed in a row along the strip. The ferromagnetic strips are so arranged that the projections of one strip are facing those of the other one. Said projections are designed to give the main magnetic field of the motor a certain shape, and for this reason they will be hereinafter referred to as a pole-forming projections. Between the above described strips is disposed a movable core which, when the motor is used e.g. in a machine tool, sets in motion its working tool. The movable core is so constructed that it consists of alternating regions having high and low magnetic permeability.

Each of the magnetic cores of the stator is constructed in the form of cogged stacks of electrical steel with elements of an excitation system disposed therebetween, said elements being permanent magnets. These magnets are connected in series in an external excitation circuit, i.e. the north pole of one magnet is turned towards the south pole of the other magnet. The magneto-motive forces developed by these magnets are directed in accordance with one another and cross the movable core in the transverse direction.

On both the magnetic cores of the stator are laid armature windings, each being divided into two coil groups having equal number of sections. The number of these windings can be any.

The above described design of the linear electric motor, alongside with obvious advantages consisting in great savings of copper, is characterized by a low efficiency which is caused by the fact that a portion of active sides of the armature windings, disposed opposite the regions of the movable core which have low magnetic permeability, is flown round by the current but does not take part in the development of the tractive force.

DISCLOSURE OF INVENTION

The invention is based on the object to provide such a linear electric motor which, due to the reduction of losses in the armature winding, would possess a higher efficiency.

The object set forth is attained by that in a linear electric motor comprising a stator whose magnetic core is formed by two equidistant strips made of a ferromagnetic material and provided with uniformly alternating projections and recesses, the projections of one strip being turned to the projections of the other strip, a movable core having regions with high and low magnetic permeability and disposed between said strips, an armature winding provided with two coil groups having equal number of sections in each group, the electrical connection between said groups being accomplished by means of a commutation device, and an excitation system, according to the invention, the projections and the recesses of each of the strips of the magnetic core of the stator have a length equal to the pole pitch of the motor and are so disposed that the projections of one strip are shifted along the movable core relative to the projections of the other strip by the magnitude of the pole pitch of the motor, the movable core has a middle portion whose length is equal to the pole pitch of the motor and two extreme portions whose length is a multiple of two pole pitches of the motor, the excitation system is an excitation winding laid on the middle portion of the movable core, the armature winding is laid within grooves on the extreme portions of said core in symmetrical relationship with respect to the excitation winding and is connected to the commutation device so that the ends of the sections of the first coil group and the beginnings of the sections of the second coil group are connected to the commutation device via semiconductor devices having elements connected with the opposite polarity, and the last section of the first coil group and the first section of the second coil group are electrically connected in the switching device.

The above described design of the linear electric motor is characterized by that in any moment only a half of the armature winding is operating, i.e. the section of this winding which is disposed opposite the projections of the magnetic cores of the stator, thereby resulting in the fact that the magnitude of the tractive force being the same, the losses in the copper of the armature are two times reduced, and correspondingly the efficiency of the motor is increased.

BRIEF DESCRIPTION OF DRAWINGS

The invention is further explained in terms of the preferred embodiment thereof with reference to the accompanying drawings, in which.

BEST MODE FOR CARRYING OUT THE INVENTION

Figure 1:
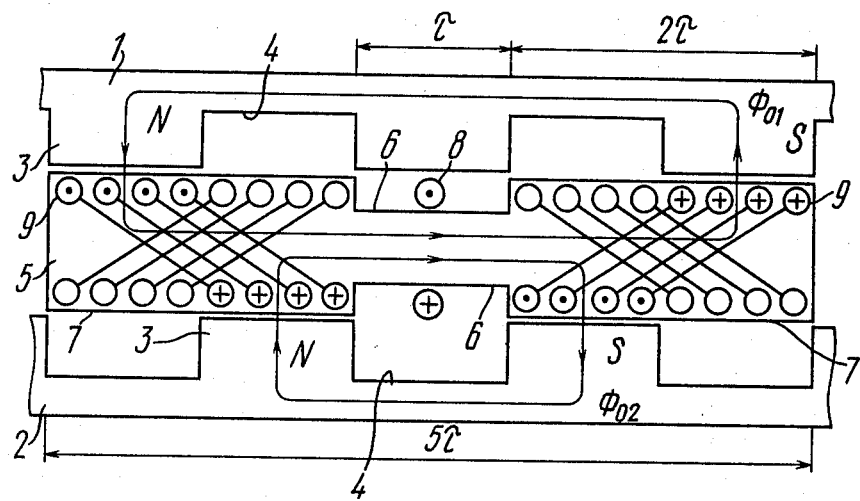
FIG. 1 shows a structural diagram of the linear electric motor of the invention.

A linear electric motor of the Invention (FIG. 1) comprises a stator whose magnetic core is formed by two equidistant strips 1,2 made of a ferromagnetic material. The strips 1 and 2 are provided with uniformly alternating pole-forming projections 3 and recesses 4 having a width of τ which is equal to one pole pitch of the motor. The porjections 3 on the strip 1 are shifted with respect to the projections 3 on the strip 2 by the distance τ so that the projections 3 of one strip are disposed opposite the recesses 4 of the other strip. Between the strips 1 and 2 is disposed a movable core 5 functioning as an armature magnetic core. This core is generally made of blended steel. In the described embodiment of the invention the core regions, characterized by high and low magnetic permeability, are constructed as a large groove 6 of a length τ, provided at the edges thereof with two equal regions 7 of a length 2 τ which extend towards each of the strips of the stator magnetic core.

Within the groove 6 is laid an excitation winding 8 forming, together with the movable core 5, an excitation system. On the regions 7, in symmetrical relationship with respect to the groove 6, is laid an armature winding 9. Each of the two portions of the armature winding 9 is located on two active sides of the movable core 5.

In the drawing, the armature winding 9 is shown as a single-layer two-plane pattern winding which is made from equal numbers of pattern sections of two sizes, i.e. smaller sections fitted directly on the movable core 5 and larger sections laid on the core 5 which is already embraced by the smaller sections. The distance between the active sides of each section, disposed on both the surfaces of the core 5, is equal to the pole pitch τ of the motor.

Figure 2:
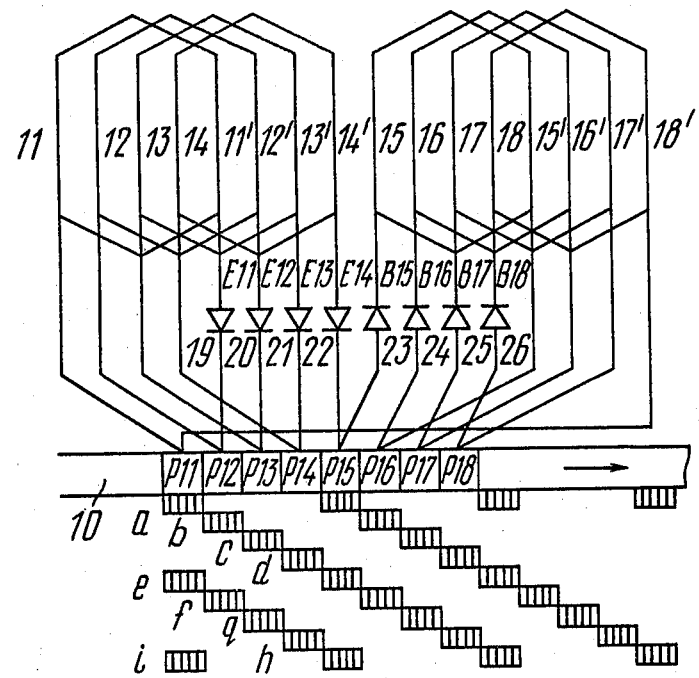
FIG. 2 illustrates the principle of formation of the armature winding circuitry of the linear electric motor of the invention.

FIG. 2 illustrates the joint between the sections of the armature winding 9 of the inventive linear electric motor and their connection to an electromechanical commutator collector 10 through gates.

The armature winding 9 of the motor consists of two equal groups of the pattern sections (in the given case the group of the larger sections 11—11', 12—12', 13—13', 14—14' and the group of the smaller sections 15—15', 16—16', 17—17', 18—18') connected to collector plates in accordance with a circuit of a simple loop right-hand winding with a right bypass in each group. The ends of the sections of the first group E11, E12, E13, E14 are connected to the collector plates P12, P13, P14, P15 through semiconductor elements 19, 20, 21, 22, while the beginnings of the sections of the second group B15, B16, B17, B18 are connected to the collector plates P15, P16, P17, P18 through semiconductor elements 23, 24, 25, 26 of the opposite polarity so that the end of the last section of the first group and the beginning of the first section of the second group are connected to a common (K/2+1) collector plate in the given case P15-th collector plate) through the semiconductor elements of the opposite polarity, where K is the total number of the collector plates in the winding.

For the arrangement of the movable core 5 and the projections of both the ferromagnetic strips 1, shown in FIG. 1, with the contact between the brushes 27, 28 with the P11-th and P15-th collector plates (FIG. 2, position "a" of the brushes), the current flows only across the first group of sections, while the second group is not flown with the current due to the opposite connection of the gates 23, 24, 25, 26. Thus, in accordance with FIG. 1, the conductors 11, 12, 13, 14 of the upper plane of the armature magnetic core and the conductors 11', 12', 13', 14' of the lower side thereof are flown with current in the directions illustrated in the figure. The right-hand side of the armature magnetic core having the armature winding 9 (FIG. 1) operates in a similar way.

The linear electromechanical collector is located together with the armature winding and semiconductor elements on the movable core 5, while the brushes are disposed on one of the ferromagnetic strips 1 or 2 with an interval equal to τ.

The operation of the invetive motor consists in the linear displacement of the armature under the action of a tractive electromagnetic force F (FIG. 1). This force appears in accordance with the Biot-Savart-Laplace's law and, with the directions of currents of the armature winding and of the magnetic flux, assumed in FIG. 1, is directed to the right. Due to the presence of this force F, the core 5 starts moving in the specified direction.

An electromechanical (or semiconductor) commutator 10 switches the current in the sections of the armature winding in such a manner that only those sections of the winding which at the given moment are disposed opposite all the projections 3 of the ferromagnetic strip are flown with current, while the sections located opposite all the recesses of said strip are de-energized.

The conductors of the left-hand portion (with respect to the excitation winding) of sections disposed opposite the projections have the same direction of currents, while the conductors of the right-hand portion of these sections also have the same (opposite) direction of currents. Such an arrangement causes the constant value of the tractive force.

In the Table below are given the numbers of sections flown with current in the course of displacement of the core 5 by the distance of 2 τ (positions a, b, c, d, e, f, g, h, i of the brushes on the collector in FIG. 2).

TABLE

| Position of armature | Collector plates with brushes + | Collector plates with brushes − | Numbers of sections with currents | | | |
|---|---|---|---|---|---|---|
| a | P11 | P15 | 11—11' | 12—12' | 13—13' | 14—14' |
| b | P18 | P14 | 18—18' | 11—11' | 12—12' | 13—13' |
| c | P17 | P13 | 17—17' | 18—18' | 11—11' | 12—12' |
| d | P16 | P12 | 16—16' | 17—17' | 18—18' | 11—11' |
| e | P15 | P11 | 15—15' | 16—16' | 17—17' | 18—18' |
| f | P14 | P18 | 14—14' | 15—15' | 16—16' | 17—17' |
| g | P13 | P17 | 13—13' | 14—14' | 15—15' | 16—16' |
| h | P12 | P16 | 12—12' | 13—13' | 14—14' | 15—15' |
| i | P11 | P15 | 11—11' | 12—12' | 13—13' | 14—14' |

Figure 3:
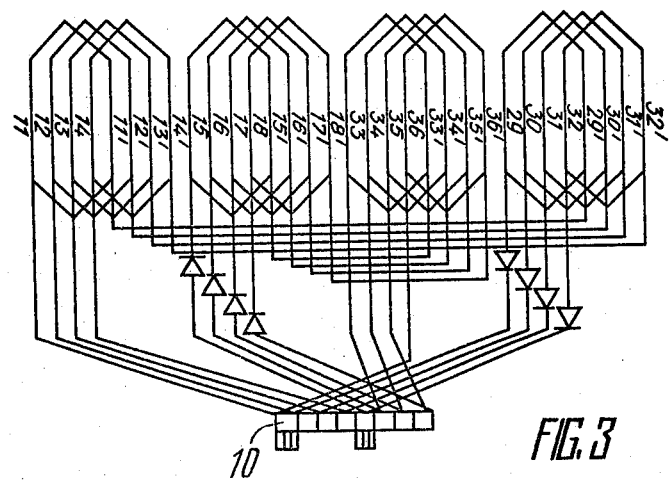
FIG. 3 shows a modification of the circuit illustrated in FIG. 2.

The armature winding, illustrated in FIG. 2, only explains the principle of operation of the linear motor of the invention. However, in the case where one parallel branch consists of larger sections and the other branch consists of smaller sections, the armature winding will be obviously unbalanced. To eliminate this phenomenon, both the parallel branches are composed from enlarged sections consisting of one larger section lying e.g. in the left-hand portion of the magnetic core, and a smaller section of the right-hand portion of the magnetic core, and correspondingly vice versa. Thus, the first parallel branch (FIG. 3) consists of four enlarged sections: 11—11' and 29'—29; 12—12' and 30'—30; 13—13' and 31'—31; 14—14' and 32'—32.

The second parallel branch also consists of four enlarged sections: 15—15' and 33'—33; 16—16' and 34'—34; 17—17' and 35'—35; 18—18' and 36'—36.

The reversal of the inventive linear electric motor can be accomplished in two ways, i.e. by switching the voltage polarity of the excitation winding (FIG. 3) when using uncontrolled semiconductor elements (gates) as semiconductor elements, and by changing the voltage polarity on the brushes when using controlled rectifiers (thyristors) as semiconductor elements. In the last case the semiconductor elements comprise two thyristors connected anti-parallel. It is possible to use symmetric thyristors (triacs) instead of the thyristors connected anti-parallel.

Thus, due to the fact that in the given arrangement of the linear electric motor only a half of the armature winding always operates (winding sections disposed opposite the projections of the stationary ferromagnetic strips), the losses in the copper are two times reduced, and correspondingly the motor efficiency is increased.

INDUSTRIAL APPLICABILITY

The invention can be used in the development of electric drives intended for reciprocating motion and rectilinear displacement with a wide range of speed control.

The invention may prove most advantageous in the art of machine-tool engineering.

We claim:

1. A linear electric motor comprising a stator whose magnetic core is formed by two equidistant strips made of a ferromagnetic material and provided with uniformly alternating projections and recesses, the projections of one strip, being turned to the projections of the other strip a movable core having regions with high and low magnetic permeability and disposed between said strips, an armature winding provided with two coil groups having equal number of sections in each group, the electrical connection between said groups being accomplished by means of a commutation device, and an excitation system, characterized in that the projections /3/ and the recesses /4/ of each of the strips /1/, /2/ of the magnetic core of the stator have a length equal to the pole pitch of the motor and are so disoped that the projections /3/ of one strip /1/ are shfted along the movable core /5/ relative to the projections /3/ of the other strip by the magnitude of the pole pitch of the motor, the movable core /5/ has a middle portion /6/ whose length is equal to the pole pitch of the motor and two extreme portions whose length is a multiple of two pole pitches of the motor, the excitation system is an excitation winding /8/ laid on the middle portion /6/ of the movable core, the armature winding /9/ is laid within grooves on the extreme portions of said core in symmetrical relationship with respect to the excitation winding /8/ and is connected to the commutation device /10/ so that the ends of the sections of the first coil group and the beginnings of the sections of the second coil group are connected to the commutation device /10/ via semiconductor devices having elements connected with the opposite polarity, and the last section of the first coil group and the first section of the second coil group are electrically connected in the commutation device /10/.

* * * * *